US010735927B2

(12) United States Patent
Sun et al.

(10) Patent No.: US 10,735,927 B2
(45) Date of Patent: Aug. 4, 2020

(54) V2V COMMUNICATION METHOD, DEVICE, AND SYSTEM

(71) Applicant: HUAWEI TECHNOLOGIES CO., LTD., Shenzhen, Guangdong (CN)

(72) Inventors: Jizhong Sun, Xi'an (CN); Liang Chen, Xi'an (CN); Rui Yue, Xi'an (CN); Hui Yan, Xi'an (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 3 days.

(21) Appl. No.: 16/153,455

(22) Filed: Oct. 5, 2018

(65) Prior Publication Data

US 2019/0045337 A1 Feb. 7, 2019

Related U.S. Application Data

(63) Continuation of application No. PCT/CN2017/079479, filed on Apr. 5, 2017.

(30) Foreign Application Priority Data

Apr. 8, 2016 (CN) .......................... 2016 1 0219028

(51) Int. Cl.
*H04W 4/46* (2018.01)
*H04W 40/02* (2009.01)
(Continued)

(52) U.S. Cl.
CPC .............. *H04W 4/46* (2018.02); *H04W 4/00* (2013.01); *H04W 40/02* (2013.01); *H04W 72/1289* (2013.01)

(58) Field of Classification Search
CPC ....... H04W 72/042; H04W 4/40; H04W 4/46; H04W 72/04; H04W 72/0493;
(Continued)

(56) References Cited

U.S. PATENT DOCUMENTS

2013/0301582 A1 11/2013 Jiang et al.
2015/0282210 A1 10/2015 Li et al.
(Continued)

FOREIGN PATENT DOCUMENTS

CN 104244416 A 12/2014
CN 104254132 A 12/2014
(Continued)

OTHER PUBLICATIONS

3GPP TS 36.321 V13.1.0 (Mar. 2016), 3rd Generation Partnership Project; Technical Specification Group Radio Access Network; Evolved Universal Terrestrial Radio Access (E-UTRA); Medium Access Control (MAC) protocol specification (Release 13), Mar. 2016, 85 pages.

(Continued)

*Primary Examiner* — Awet Haile
(74) *Attorney, Agent, or Firm* — Womble Bond Dickinson (US) LLP

(57) ABSTRACT

The present invention provides a vehicle to vehicle (V2V) communication method, a device, and a system, and relates to the field of communications technologies, to resolve a problem that scheduling overheads of physical downlink control channel (PDCCH) information are relatively large in existing V2V communication. The method may include receiving, by a first vehicle terminal, a first SPS configuration parameter that includes a first semi-persistent scheduling (SPS) period and that is sent by the base station. The method may also include receiving first scheduling control information that is used to instruct the first vehicle terminal to perform SPS activation and that is sent by the base station, and sending a V2V data packet to a second vehicle terminal.

13 Claims, 4 Drawing Sheets

(51) Int. Cl.
*H04W 72/12* (2009.01)
*H04W 4/00* (2018.01)

(58) Field of Classification Search
CPC .......... H04W 72/044; H04W 72/1263; H04W 72/12; H04W 72/1294; H04W 4/44; H04W 72/1205; H04W 76/30; H04W 4/70; H04W 72/1278; H04W 28/26; H04W 28/0278; H04W 84/005; H04W 52/325; H04L 5/0064; H04L 29/08306; H04L 5/0032
See application file for complete search history.

(56) References Cited

U.S. PATENT DOCUMENTS

| | | | |
|---|---|---|---|
| 2016/0345307 A1 | 11/2016 | Huang et al. | |
| 2017/0019887 A1* | 1/2017 | Jiang | H04W 72/042 |
| 2018/0160418 A1* | 6/2018 | Luo | H04W 72/04 |
| 2019/0045507 A1* | 2/2019 | Sorrentino | H04W 48/12 |

FOREIGN PATENT DOCUMENTS

| | | |
|---|---|---|
| CN | 104284340 A | 1/2015 |
| CN | 104812025 A | 7/2015 |

OTHER PUBLICATIONS

Ericsson,"Discussion on Uu Enhancements for V2X",3GPP TSG-RAN WG2 #93 Tdoc R2-161565,Malta, Feb. 15-19, 2016,total 8 pages.

Huawei et al.,"SPS enhancement for V2V",3GPP TSG RAN WG1 Meeting #84bis R1-162122,Busan, Korea, Apr. 11-15, 2016,total 6 pages.

NTT Docomo,"Discussion on Resource Control and Selection for PC5 based V2V Communications",3GPP TSG RAN WG1 Meeting #84 R1-161049,St Julian's, Malta, Feb. 15-19, 2016,total 5 pages.

* cited by examiner

Subframe header

V2V COMMUNICATION METHOD, DEVICE, AND SYSTEM

CROSS-REFERENCE TO RELATED APPLICATIONS

This application is a continuation of International Application No. PCT/CN2017/079479, filed on Apr. 5, 2017, which claims priority to Chinese Patent Application No. 201610219028.3, filed on Apr. 8, 2016. The disclosures of the aforementioned applications are hereby incorporated by reference in their entireties.

TECHNICAL FIELD

The present application relates to the field of communications technologies, and in particular, to a vehicle to vehicle (V2V) wireless communication method, a device, and a system.

BACKGROUND

With continuous development of the society, vehicles become more popular. While bringing convenience to people, driving also brings some negative impacts to the human society. For example, a rapid increase of vehicles causes a series of problems such as traffic congestion and frequent traffic accidents. To avoid these problems, vehicles may obtain road condition information or receive an information service in a timely manner through V2V communication. For example, a vehicle may broadcast, to a surrounding vehicle, V2V information of the vehicle such as a speed, a driving direction, a specific location, and whether an emergency brake is slammed on, so that a driver of the surrounding vehicle can better perceive a traffic condition beyond a line of sight based on the obtained information. Therefore, the driver of the surrounding vehicle can learn of a dangerous situation in advance, and correspondingly dodge. In this way, an occurrence frequency of the foregoing problems is reduced.

Currently, in a Long Term Evolution (LTE) communications network, V2V communication between vehicles may be implemented by using a relatively mature device to device (D2D) communications technology. That is, a physical downlink control channel (PDCCH) information delivered by a base station is received, and service information is sent to a peer vehicle on a resource indicated by the PDCCH information. However, due to frequent V2V communication between vehicles, the base station needs to frequently send the PDCCH information to the vehicle if the current D2D communication method is used. This increases scheduling overheads of the PDCCH information.

SUMMARY

A primary objective of the present invention is to provide a V2V communication method, a device, and a system, to resolve a problem that scheduling overheads of PDCCH information are relatively large in existing V2V communication.

To achieve the foregoing objective, the following technical solutions are used in embodiments of the present invention:

According to a first aspect, an embodiment of the present invention provides a vehicle to vehicle V2V communication method, and the method may include:

receiving, by a first vehicle terminal, a first semi-persistent scheduling (SPS) configuration parameter sent by a base station, where the first SPS configuration parameter includes a first SPS period; and receiving, by the first vehicle terminal, first scheduling control information sent by the base station, and sending a V2V data packet to a second vehicle terminal based on the first SPS period, where the first scheduling control information is used to instruct the first vehicle terminal to perform SPS activation.

In this way, semi-persistent scheduling activation is performed on the first vehicle terminal by using the base station. Therefore, the first vehicle terminal periodically sends a V2V data packet to the second vehicle terminal based on an SPS period, and does not need to receive PDCCH information delivered by the base station each time before V2V communication, so as to reduce scheduling overheads of the PDCCH information of the base station.

Optionally, in an embodiment of the first aspect, the first vehicle terminal may determine that the first vehicle terminal meets an SPS activation condition; send, to the base station, first indication information that is used to indicate that the first vehicle terminal meets the SPS activation condition; and then receive the first scheduling control information sent by the base station. Alternatively, the base station determines that the first vehicle terminal meets an SPS activation condition, and then directly sends the first scheduling control information to the first vehicle terminal.

For the first vehicle terminal and the base station, if the first vehicle terminal consecutively receives or sends N data packets, all the N data packets are V2V data packets, and a receiving or sending time interval between any two adjacent data packets in the N data packets meets a preset time interval, the first vehicle terminal determines that the first vehicle terminal meets the SPS activation condition, where N is greater than or equal to a first threshold.

Further, in an embodiment of an actual application, a sending period of a data packet sent by the vehicle terminal or a size of a sent data packet may change. To adapt to these changes, SPS reactivation further needs to be performed on the first vehicle terminal, to change the SPS period or a size of a time-frequency resource for sending the V2V data packet. To be specific, in a second embodiment of the first aspect, after the sending a V2V data packet to a second vehicle terminal based on the first SPS period, the method may further include:

determining, by the first vehicle terminal, that the first vehicle terminal meets an SPS reactivation condition;

sending, by the first vehicle terminal, second indication information to the base station, where the second indication information is used to indicate that the first vehicle terminal meets the SPS reactivation condition;

receiving second scheduling control information sent by the base station, where the second scheduling control information is used to instruct the first vehicle terminal to perform SPS deactivation;

receiving a second SPS configuration parameter sent by the base station, where the second SPS configuration parameter includes a second SPS period;

receiving third scheduling control information sent by the base station, where the third scheduling control information is used to instruct the first vehicle terminal to perform SPS activation; and sending a V2V data packet to the second vehicle terminal based on the second SPS period.

Alternatively, in a third embodiment of the first aspect, after the sending a V2V data packet to a second vehicle terminal based on the first SPS period, the method may further include:

determining, by the first vehicle terminal, that the first vehicle terminal meets an SPS reactivation condition;

sending, by the first vehicle terminal, second indication information to the base station, where the second indication information is used to indicate that the first vehicle terminal meets the SPS reactivation condition;

receiving fourth scheduling control information sent by the base station, where the fourth scheduling control information is used to instruct the first vehicle terminal to perform SPS reactivation; and sending a V2V data packet to the second vehicle terminal based on a third SPS period; where the third SPS period is configured by the first vehicle terminal.

The determining that the first vehicle terminal meets an SPS reactivation condition may include:

if a ratio of a quantity of first SPS periods in which no data is sent and that are in M first SPS periods to M is greater than or equal to a second threshold, determining that the first vehicle terminal meets the SPS reactivation condition; or if a ratio of a quantity of first SPS periods in which no data is sent and that are in M first SPS periods to M is less than a second threshold, and the first vehicle terminal loses a V2V data packet in a first SPS period in which data is sent, determining that the first vehicle terminal meets the SPS reactivation condition, where M is an integer greater than or equal to 1.

Further, in a fourth embodiment of the first aspect, after the sending a V2V data packet to a second vehicle terminal based on the first SPS period, the method may further include:

determining that the first vehicle terminal meets an SPS deactivation condition;

sending third indication information to the base station, where the third indication information is used to indicate that the first vehicle terminal meets the SPS deactivation condition;

receiving fifth scheduling control information sent by the base station, where the fifth scheduling control information is used to instruct the first vehicle terminal to perform SPS deactivation; and stopping sending the V2V data packet to the second vehicle terminal based on the first SPS period.

The determining that the first vehicle terminal meets an SPS deactivation condition may include:

if no data is sent in Q first SPS periods that are consecutive in time, and Q is greater than or equal to a third threshold, determining that the first vehicle terminal meets the SPS deactivation condition; or if a size of a data packet that is sent in Q first SPS periods that are consecutive in time is less than a fourth threshold, determining that the first vehicle terminal meets the SPS deactivation condition, where Q is an integer greater than or equal to 1.

It should be noted that, in this embodiment of the present invention, the first indication information, the second indication information, or the third indication information in the foregoing procedure may be carried in any one of the following information to be reported to the base station, so that the base station learns that an SPS activation procedure, an SPS reactivation procedure, or an SPS deactivation procedure can be triggered for the first vehicle terminal:

BSR information, MAC CE information, radio link control RRC information, or physical uplink control channel PUCCH information.

The MAC CE information may include a MAC subframe header, and the MAC subframe header includes a first field and a second field; the first field is used to indicate that the first SPS period is increased, the first SPS period is decreased, or the first SPS period does not need to be reconfigured; and the second field is used to indicate the indication information.

Alternatively, the MAC CE information may include a control field, and the control field includes a first subfield, a second subfield, and a third subfield; the first subfield is used to indicate the indication information; the second subfield is used to indicate a size of the first SPS period; and the third subfield is used to indicate a size of a data packet sent in the first SPS period.

Correspondingly, after the base station receives the indication information, the base station may trigger the SPS activation procedure, the SPS reactivation procedure, or the SPS deactivation procedure for the first vehicle terminal based the indication information by using the PDCCH information. To be specific, the first scheduling control information, the second scheduling control information, the third scheduling control information, the fourth scheduling control information, or the fifth scheduling control information is carried in physical downlink control channel PDCCH information to be sent to the first vehicle terminal.

Specifically, the PDCCH information includes format information used to indicate a transport format of the PDCCH information, the format information includes a third field, and the third field is used to indicate the scheduling control information.

According to a second aspect, an embodiment of the present invention provides a vehicle to vehicle V2V communication method, and the method may include:

sending, by a base station, a first semi-persistent scheduling SPS configuration parameter to a first vehicle terminal, where the first SPS configuration parameter includes a first SPS period; and sending, by the base station, first scheduling control information to the first vehicle terminal, so that the first vehicle terminal sends a V2V data packet to a second vehicle terminal based on the first SPS period, where the first scheduling control information is used to instruct the first vehicle terminal to perform SPS activation.

In this way, semi-persistent scheduling activation is performed on the first vehicle terminal by using the base station. Therefore, the first vehicle terminal periodically sends a V2V data packet to the second vehicle terminal based on an SPS period, and does not need to receive PDCCH information delivered by the base station each time before V2V communication, so as to reduce scheduling overheads of the PDCCH information of the base station.

Optionally, in an embodiment of the second aspect, the first vehicle terminal may determine that the first vehicle terminal meets an SPS activation condition; send, to the base station, first indication information that is used to indicate that the first vehicle terminal meets the SPS activation condition; and then, receive the first scheduling control information sent by the base station. Alternatively, the base station determines that the first vehicle terminal meets an SPS activation condition, and then directly sends the first scheduling control information to the first vehicle terminal.

Further, in an embodiment of an actual application, a sending period of a data packet sent by the vehicle terminal or a size of a sent data packet may change. To adapt to these changes, SPS reactivation further needs to be performed on the first vehicle terminal, to change the SPS period or a size of a time-frequency resource for sending the V2V data packet. To be specific, in a second embodiment of the second aspect, after the sending, by the base station, first scheduling control information to the first vehicle terminal, the method may further include:

receiving, by the base station, second indication information sent by the first vehicle terminal, where the second indication information is used to indicate that the first vehicle terminal meets an SPS reactivation condition;

sending, by the base station, second scheduling control information to the first vehicle terminal, where the second scheduling control information is used to instruct the first vehicle terminal to perform SPS deactivation;

sending, by the base station, a second SPS configuration parameter to the first vehicle terminal, where the second SPS configuration parameter includes a second SPS period; and sending, by the base station, third scheduling control information to the first vehicle terminal, so that the first vehicle terminal sends a V2V data packet to the second vehicle terminal based on the second SPS period, where the third scheduling control information is used to instruct the first vehicle terminal to perform SPS activation.

Alternatively, in a third embodiment of the second aspect, after the sending a V2V data packet to a second vehicle terminal based on the first SPS period, the method may further include:

receiving, by the base station, second indication information sent by the first vehicle terminal, where the second indication information is used to indicate that the first vehicle terminal meets an SPS reactivation condition; and sending, by the base station, fourth scheduling control information to the first vehicle terminal, so that the first vehicle terminal sends a V2V data packet to the second vehicle terminal based on a third SPS period, where the fourth scheduling control information is used to instruct the first vehicle terminal to perform SPS reactivation, and the third SPS period is configured by the first vehicle terminal.

Further, in a fourth embodiment of the second aspect, after the sending, by the base station, first scheduling control information to the first vehicle terminal, the method may further include:

receiving, by the base station, third indication information sent by the first vehicle terminal, where the third indication information is used to indicate that the first vehicle terminal meets an SPS deactivation condition; and sending, by the base station, fifth scheduling control information to the first vehicle terminal, so that the first vehicle terminal stops sending the V2V data packet to the second vehicle terminal based on the first SPS period, where the fifth scheduling control information is used to instruct the first vehicle terminal to perform SPS deactivation.

It should be noted that, in this embodiment of the present invention, the first indication information, the second indication information, or the third indication information in the foregoing procedure may be carried in any one of the following information to be reported to the base station, so that the base station learns that an SPS activation procedure, an SPS reactivation procedure, or an SPS deactivation procedure can be triggered for the first vehicle terminal:

BSR information, MAC CE information, radio link control RRC information, or physical uplink control channel PUCCH information.

The MAC CE information may include a MAC subframe header, and the MAC subframe header includes a first field and a second field; the first field is used to indicate that the first SPS period is increased, the first SPS period is decreased, or the first SPS period does not need to be reconfigured; and the second field is used to indicate the indication information.

Alternatively, the MAC CE information may include a control field, and the control field includes a first subfield, a second subfield, and a third subfield; the first subfield is used to indicate the indication information; the second subfield is used to indicate a size of the first SPS period; and the third subfield is used to indicate a size of a data packet sent in the first SPS period.

Correspondingly, after the base station receives the indication information, the base station may trigger the SPS activation procedure, the SPS reactivation procedure, or the SPS deactivation procedure for the first vehicle terminal based the indication information by using the PDCCH information. To be specific, the first scheduling control information, the second scheduling control information, the third scheduling control information, the fourth scheduling control information, or the fifth scheduling control information is carried in physical downlink control channel PDCCH information to be sent to the first vehicle terminal.

Specifically, the PDCCH information includes format information used to indicate a transport format of the PDCCH information, the format information includes a third field, and the third field is used to indicate the scheduling control information.

According to a third aspect, an embodiment of the present invention provides a vehicle terminal, and the vehicle terminal may include:

a receiving unit, configured to receive a first semi-persistent scheduling SPS configuration parameter sent by a base station, where the first SPS configuration parameter includes a first SPS period, and the receiving unit is further configured to receive first scheduling control information sent by the base station, where the first scheduling control information is used to instruct the vehicle terminal to perform SPS activation; and a sending unit, configured to send a V2V data packet to a second vehicle terminal based on the first SPS period.

Specifically, for an implementation of each functional unit in the third aspect, refer to functions of behavior of the first vehicle terminal in the method provided in the first aspect.

According to a fourth aspect, an embodiment of the present invention provides a base station, and the base station may include:

a sending unit, configured to: send a first semi-persistent scheduling SPS configuration parameter to a first vehicle terminal, where the first SPS configuration parameter includes a first SPS period; and send first scheduling control information to the first vehicle terminal, so that the first vehicle terminal sends a V2V data packet to a second vehicle terminal based on the first SPS period, where the first scheduling control information is used to instruct the first vehicle terminal to perform SPS activation.

Specifically, for an implementation of each functional unit in the fourth aspect, refer to functions of behavior of the base station in the method provided in the second aspect.

It should be noted that, the function modules described in the third aspect and the fourth aspect may be implemented by hardware, or may be implemented by hardware executing corresponding software. The hardware or the software includes one or more modules corresponding to the functions. For example, a receiver is configured to complete a function of the receiving unit, a transmitter is configured to complete a function of the sending unit, a processor is configured to complete a function of a processing unit, and the processor, the transmitter, the receiver, and a memory are connected to and communicate with each other by using a bus. Specific implementation is as follows:

According to a fifth aspect, an embodiment of the present invention provides a vehicle terminal, and the vehicle terminal may include:

a communications unit, configured to: receive a first semi-persistent scheduling SPS configuration parameter sent by a base station, where the first SPS configuration parameter includes a first SPS period;

receive first scheduling control information sent by the base station, where the first scheduling control information is used to instruct the vehicle terminal to perform SPS activation; and send a V2V data packet to a second vehicle terminal based on the first SPS period.

Specifically, for an implementation of the communications unit in the fifth aspect, refer to the implementation of the sending unit and the receiving unit in the third aspect.

According to a sixth aspect, an embodiment of the present invention provides a base station, and the base station may include:

a communications unit, configured to: send a first semi-persistent scheduling SPS configuration parameter to a first vehicle terminal, where the first SPS configuration parameter includes a first SPS period; and send first scheduling control information to the first vehicle terminal, so that the first vehicle terminal sends a V2V data packet to a second vehicle terminal based on the first SPS period, where the first scheduling control information is used to instruct the first vehicle terminal to perform SPS activation.

Specifically, for an implementation of the communications unit in the sixth aspect, refer to the implementation of the sending unit in the fourth aspect.

According to a seventh aspect, an embodiment of the present invention provides a V2V communications system. The V2V communications system includes the vehicle terminal in the third aspect and the base station in the fourth aspect; or includes the vehicle terminal in the fifth aspect and the base station in the sixth aspect.

It may be learned from the above that, the embodiments of the present invention provide a V2V communication method, a device, and a system. The base station sends, to the first vehicle terminal, the first SPS configuration parameter that includes the first SPS period. After receiving the first scheduling control information that is sent by the base station and that is used to instruct the first vehicle terminal to perform SPS activation, the first vehicle terminal sends the V2V data packet to the second vehicle terminal based on the first SPS period. In this way, semi-persistent scheduling is performed by using the base station. Therefore, the V2V data packet is periodically sent, and the PDCCH information delivered by the base station does not need to be received each time before V2V communication, so as to reduce scheduling overheads of the PDCCH information of the base station, increase a network capacity, and reduce a service processing delay of V2V communication.

DESCRIPTION OF EMBODIMENTS

Message sending between vehicles usually complies with a rule. For example, a security message in a specific size is sent based on a specific period. In view of this, the present invention mainly uses a semi-persistent scheduling solution to implement vehicle to vehicle (V2V) communication. A base station first indicates current scheduling information to a vehicle by using a PDCCH. After identifying that current scheduling is semi-persistent scheduling, the vehicle stores the current scheduling information, and sends or receives V2V service data at a same time-frequency resource location at intervals of a fixed period. To be specific, PDCCH authorization is performed for one time to periodically send a V2V data packet, and PDCCH information delivered by the base station does not need to be received each time before V2V communication. In this way, scheduling overheads of the PDCCH information of the base station are reduced, a network capacity is increased, and a service processing delay of V2V communication is reduced.

Figure 1:
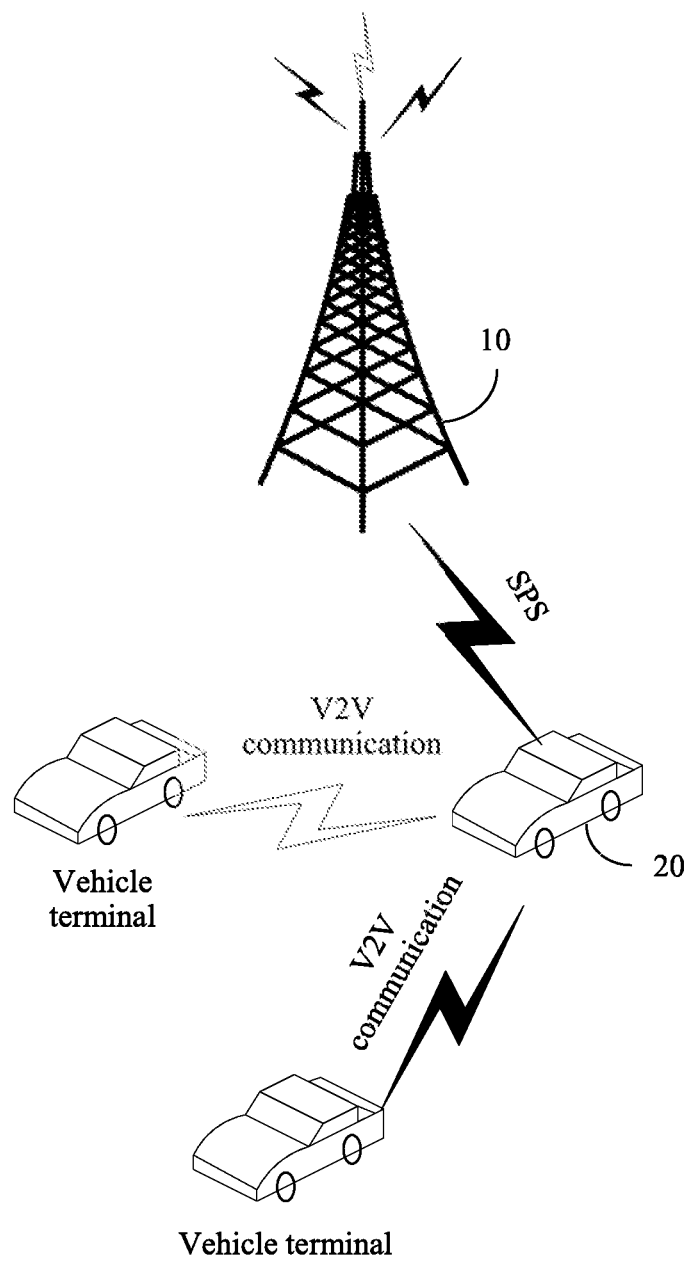
FIG. 1 is a schematic diagram of a system architecture according to an embodiment of the present invention.

FIG. 1 shows a simplified schematic diagram of a system architecture applicable to the present invention. Referring to FIG. 1, the system architecture may include a base station 10 and at least one vehicle terminal (VUE) 20. The VUE 20 falls within coverage of the base station. The base station 10 may perform semi-persistent scheduling (SPS) on any VUE 20 in the coverage of the base station 10. The VUE 20 scheduled by the base station 10 may periodically perform V2V communication with another VUE at a fixed interval.

Figure 2:
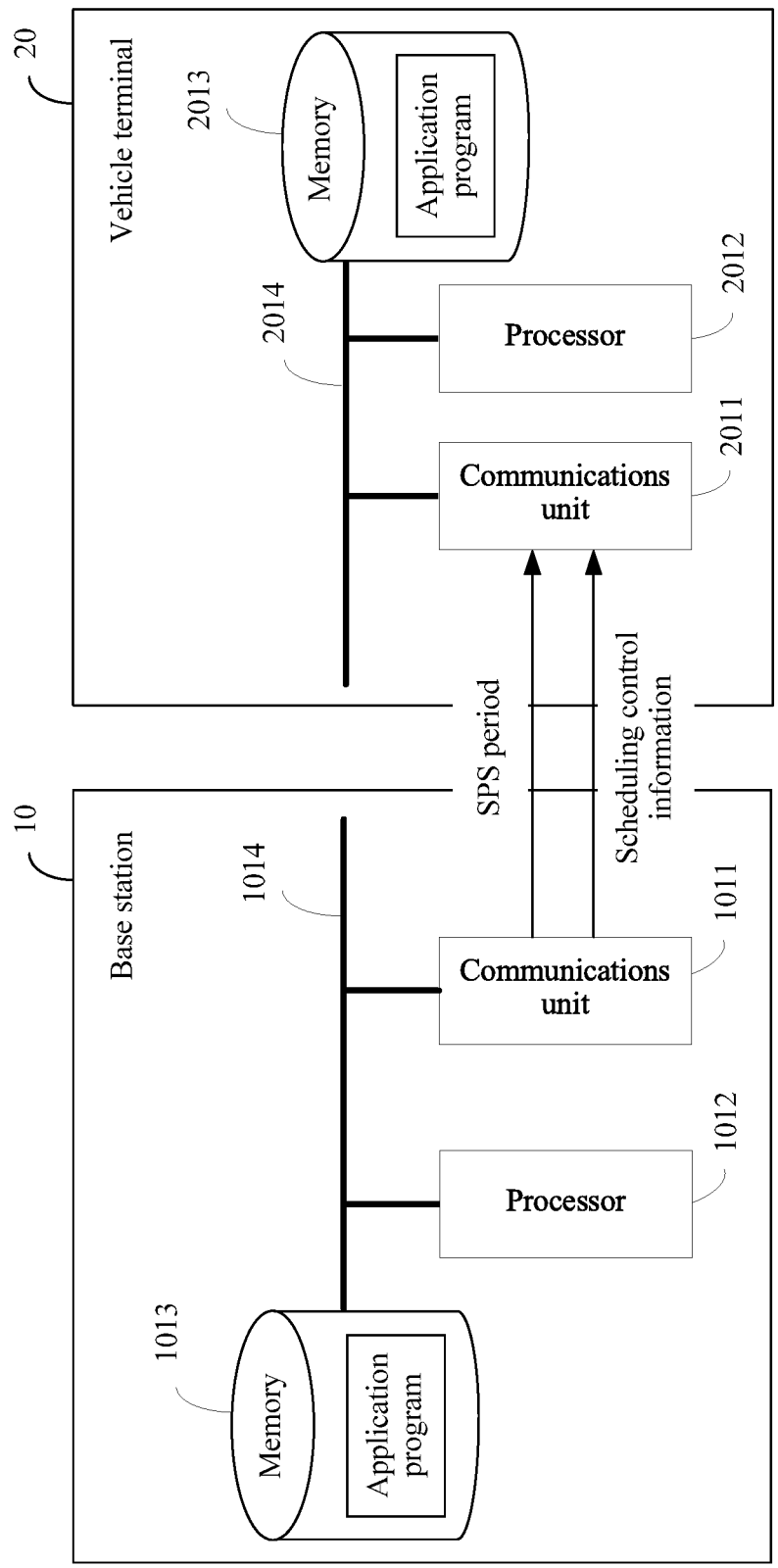
FIG. 2 is a schematic diagram of a system architecture according to an embodiment of the present invention.

As shown in FIG. 2, the base station 10 may include: a communications unit 1011, a processor 1012, a memory 1013, and at least one communications bus 1014. The at least one communications bus 1014 is configured to implement connection and mutual communication between these apparatuses. The VUE 20 may include: a communications unit 2011, a processor 2012, a memory 2013, and at least one communications bus 2014. The at least one communications bus 2014 is configured to implement connection and mutual communication between these apparatuses.

The communications unit 1011 and the communications unit 2011 may be configured to perform data exchange with an external network element. For example, the communications unit 1011 of the base station 10 may perform data exchange with the VUE 20, and the communications unit 2011 of the VUE 20 may perform data exchange with the base station 10.

The processor 1012 and the processor 2012 may be a central processing unit (CPU), may be an application-specific integrated circuit (ASIC), or may be one or more integrated circuits configured to implement the embodiments of the present invention, for example, one or more microprocessors (DSP) or one or more field programmable gate arrays (FPGA).

The memory 1013 and the memory 2013 may be a volatile memory, for example, a random access memory (RAM); or may be a non-volatile memory, for example, a read-only memory (ROM), a flash memory, a hard disk drive (HDD), or a solid-state drive (SSD); or may be a combination of the foregoing types of memories.

The communications bus 1015 and the communications bus 2015 may be classified as an address bus, a data bus, a control bus, or the like; and may be an industry standard architecture (ISA) bus, a peripheral component interconnect (PCI) bus, an extended industry standard architecture (Extended Industry Standard Architecture, EISA) bus, or the like. For ease of denotation, the communications bus is indicated by using only one bold line in FIG. 2; however, it does not indicate that there is only one bus or only one type of bus.

Specifically, the communications unit 1011 of the base station 10 first sends, to the communications unit 2011 of the vehicle terminal 20, a first SPS configuration parameter that includes a first SPS period.

Subsequently, the communications unit 1011 receives indication information that is sent by the communications unit 2011 and that is used to indicate that the vehicle terminal 20 needs to perform SPS scheduling, or a controller 1012 of the base station 10 determines that the vehicle terminal meets SPS scheduling. In this case, the base station triggers an SPS scheduling procedure, and sends, to the communications unit 2011 of the vehicle terminal by using the communications unit 1011, scheduling control information that is used to instruct the vehicle terminal 20 to perform SPS activation.

After the communications unit 2011 of the vehicle terminal 20 receives scheduling control information sent by the communications unit 1011, a controller 2012 of the vehicle terminal 20 controls the communications unit 2011 to send a V2V data packet to another vehicle terminal based on the first SPS period.

In this way, semi-persistent scheduling is performed on the vehicle terminal by using the base station. Therefore, the vehicle terminal periodically sends the V2V data packet to the another vehicle terminal based on an SPS period, and does not need to receive PDCCH information delivered by the base station each time before V2V communication, so as to reduce scheduling overheads of the PDCCH information of the base station.

For ease of description, Embodiment 1 shows and describes, in detail in a form of steps, the V2V communication method in the present invention. The shown steps may be performed in the device in the system architecture shown in FIG. 1, and may be further performed in, for example, a computer system including a group of executable instructions. In addition, even though a logical sequence is shown in the figure, in some cases, the shown or described steps may be performed in a sequence different from the sequence herein.

Embodiment 1

Figure 3:
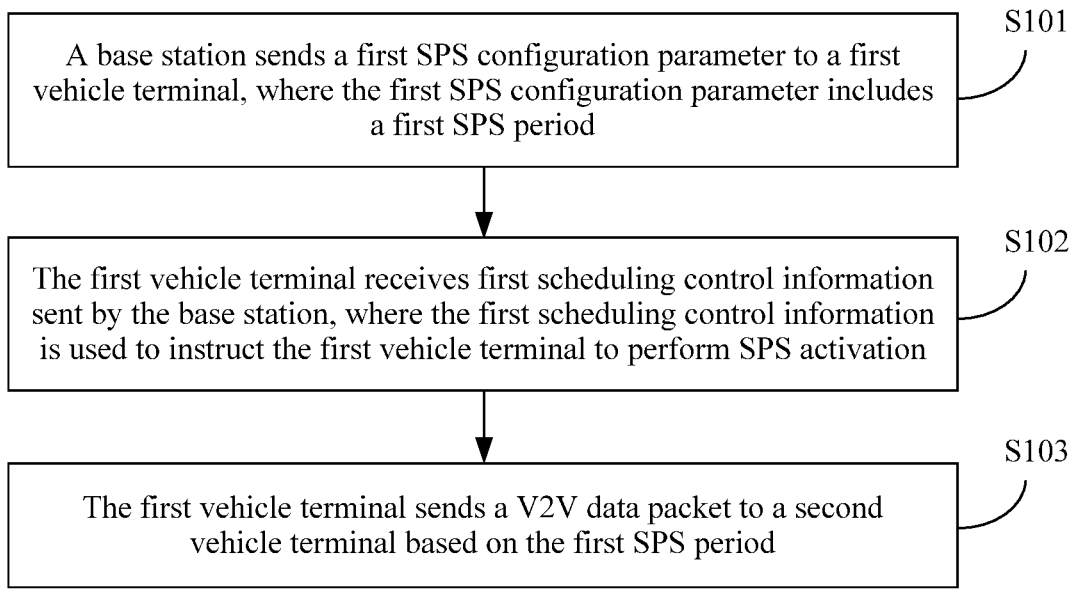
FIG. 3 is a flowchart of V2V communication according to an embodiment of the present invention.

FIG. 3 is a flowchart of a V2V communication method according to an embodiment of the present invention. The method may be performed by the base station and the first vehicle terminal in the system architecture shown in FIG. 1 in an interaction manner. The first vehicle terminal may be any vehicle terminal in the system architecture shown in FIG. 1. As shown in FIG. 3, the method may include the following steps.

S101. The base station sends a first SPS configuration parameter to the first vehicle terminal, where the first SPS configuration parameter includes a first SPS period.

The first SPS period may be set according to a time rule in which the first vehicle terminal sends a message to another vehicle terminal, to be specific, may be set according to a packet sent rule in a V2V service model. The first SPS period may include at least one scheduling control (SC) period. Generally, a semi-persistent scheduling period semiPersistSchedInterval_Vue=min((V2V service period/SC period)*SC period, N*SC period).

Optionally, the base station may add semi-persistent scheduling configuration of a V2V service (SPS-ConfiV2V) to semi-persistent scheduling configuration (SPS-Config) in radio resource control (Radio Resource Control, RRC) connection reconfiguration (RRC Connection Reconfiguration), so that the base station centrally configures an RRC parameter, and sends the first SPS configuration parameter to the first vehicle terminal by using configured RRC information. To be specific, SPS-ConfigV2V enabling signaling is added to SPS-Config, so that the base station notifies the first vehicle terminal of the SPS period. One embodiment of an implementation is as follows:

```
SPS-Config ::=  SEQUENCE {
semiPersistSchedSL-RNTI SL-RNTI   OPTIONAL,-- Need OR
SPS-ConfigV2V   SPS-ConfigV2V   OPTIONAL -- Need ON
...
}
SPS- ConfigV2V::=  CHOICE {
    release                 NULL,
    setup                         SEQUENCE {
    semiPersistSchedIntervalV2V ENUMERATED {
        sf50, sf100, sf200, sf300, sf400, sf500, sf600, sf700, spare6,
                             spare5, spare4, spare3, spare2, spare1},
    implicitReleaseAfter        ENUMERATED {e2, e4, e6, e8},
    implicitActivationAfter     ENUMERATED {e2, e4, e6, e8},
}
```

It may be understood that, subsequently, if data packets in different sizes are transmitted between vehicles based on at least two different periods according to a development requirement of the V2V service model, the first SPS configuration parameter sent by the base station to the first vehicle terminal needs to include at least two SPS periods. For example, if a VUE 1 periodically sends, to a VUE 2, a first type of message in a period of time at intervals of 100 s, and periodically sends a second type of message to the VUE 2 at intervals of 500 s, the base station needs to send, to the VUE 1, an SPS configuration parameter including two SPS periods: 100 s and 500 s.

S102. The first vehicle terminal receives first scheduling control information sent by the base station, where the first scheduling control information is used to instruct the first vehicle terminal to perform SPS activation.

Optionally, the first vehicle terminal may determine that the first vehicle terminal meets an SPS activation condition; send, to the base station, first indication information that is used to indicate that the first vehicle terminal meets the SPS activation condition; and then receive the first scheduling control information sent by the base station. Alternatively, the base station determines that the first vehicle terminal meets an SPS activation condition, and then directly sends the first scheduling control information to the first vehicle terminal. The first vehicle terminal and the base station may determine that the first vehicle terminal meets the SPS activation condition in a same manner, and specific implementation is as follows:

obtaining a status of receiving or sending a data packet by the first vehicle terminal in a period of time; and if the first vehicle terminal consecutively receives or sends N data packets, all the N data packets are V2V data packets, and a receiving or sending time interval between any two adjacent data packets in the N data packets meets a preset time interval, determining that the first vehicle terminal meets the SPS activation condition, where N is greater than or equal to a first threshold.

The preset time interval may be a security message sending period, and the first threshold may be set according to a requirement. This is not limited in this embodiment of the present invention. Preferably, the first threshold may be set to 4.

S103. The first vehicle terminal sends a V2V data packet to a second vehicle terminal based on the first SPS period.

The second vehicle terminal is any vehicle terminal that performs V2V communication with the first vehicle terminal. Optionally, the first vehicle terminal may periodically send the V2V data packet to the second vehicle terminal based on the first SPS period. For example, if the first SPS is 100 s, the first vehicle terminal periodically sends the V2V data packet to the second vehicle terminal at intervals of 100 s.

For any first SPS period, before sending a V2V data packet to the second vehicle terminal in this SPS period, the first vehicle terminal needs to allocate a time-frequency resource for sending the V2V data packet in this SPS period and a time-frequency resource for scheduling allocation (SA). The SA is used to indicate the time-frequency resource for sending a V2V data packet. Then, the first vehicle terminal sends the SA and the V2V data packet to the second vehicle terminal on the allocated time-frequency resource. In this way, after receiving the SA, the second vehicle terminal obtains the V2V data packet based on an indication of the SA. Specifically, the first vehicle terminal may allocate a time-frequency resource for SA and a time-frequency resource for a V2V data packet in an $M^{th}$ first SPS period in the following manner:

(10*$SFN$+subframe)=[(10*$SFN$start time+subframestart time)+$M$*semiPersistSchedInterval_Vue] modulo 10240, where SFNstart time is a start frame; subframestart time is a start subframe; SFNstart time and subframestart time may be included in the first scheduling control information to be sent to the first vehicle terminal; and the first scheduling control information may be a PDCCH message.

For example, after generating a V2V data packet that meets V2V communication, the first vehicle terminal may request, by using a scheduling request (Scheduling Request, SR) message or a buffer status request (Buffer Status Report, BSR) message, the base station to perform SPS scheduling and allocate a time-frequency resource for transmitting the V2V data packet. After receiving the SR message or the BSR message, the base station may initiate SPS scheduling to the first vehicle terminal by using a PDCCH message, and allocate a start frame and a subframe number to the first vehicle terminal. To shorten a transmission delay of the V2V data packet, a difference between a moment at which the first vehicle terminal generates the V2V data packet and a moment at which the base station delivers the PDCCH message needs to be as small as possible. It is preferable that the delay difference does not exceed an SC period.

Specifically, in this embodiment of the present invention, the base station may infer, from the received SR or BSR information, the moment at which the first vehicle terminal generates the V2V data packet, and determine, based on the moment and the first SPS period, the moment at which the first scheduling control information is delivered. For example, if the base station determines, by using the SR or BSR information reported by the first vehicle terminal, a moment T at which the first vehicle terminal reports the first indication information, the base station may deliver the first scheduling control information in an SC period in which (semiPersistSchedInterval_Vue+T) ms is located and a previous SC period, and perform SPS scheduling in an SC period following the SC period in which semiPersistSchedInterval_Vue+Tms is located.

Certainly, in a V2V communication process, the first vehicle terminal may further be used as a receiver to receive SA and a V2V data packet that are sent by another vehicle terminal, determine information about a time-frequency resource of the V2V data packet based on the received SA message, and obtain the V2V data packet through demodulation.

In this way, semi-persistent scheduling activation is performed on the first vehicle terminal by using the base station. Therefore, the first vehicle terminal periodically sends a V2V data packet to the second vehicle terminal based on an SPS period, and does not need to receive PDCCH information delivered by the base station each time before V2V communication, so as to reduce scheduling overheads of the PDCCH information of the base station.

Further, in the foregoing SPS activation process, if the first vehicle terminal does not receive the first scheduling control information sent by the base station, the first vehicle terminal sends the V2V data packet to the second vehicle terminal according to a dynamic scheduling procedure.

Alternatively, after the first vehicle terminal determines that the first vehicle terminal meets SPS scheduling, and sends the first indication information to the base station, if the base station does not receive the first indication information, the base station does not perform any processing.

Alternatively, the base station sets a timer, and if the base station does not receive the first indication information before the timer expires, and the base station and the first vehicle terminal are in an RRC connection, the base station disables the timer.

Further, in an embodiment of an actual application, a sending period of a data packet sent by the vehicle terminal or a size of a sent data packet may change. To adapt to these changes, SPS reactivation further needs to be performed on the first vehicle terminal, to change the SPS period or a size of a time-frequency resource for sending the V2V data packet. Specifically, after the V2V data packet is sent to the second vehicle terminal based on the first SPS period, SPS reactivation may be performed by using the following solution 1 or solution 2:

Solution 1:

If the first vehicle terminal determines that the first vehicle terminal meets an SPS reactivation condition, the first vehicle terminal sends second indication information to the base station. The second indication information is used to indicate that the first vehicle terminal meets the SPS reactivation condition.

The first vehicle terminal receives second scheduling control information sent by the base station. The second scheduling control information is used to instruct the first vehicle terminal to perform SPS deactivation.

The first vehicle terminal receives a second SPS configuration parameter sent by the base station. The second SPS configuration parameter includes a second SPS period.

The first vehicle terminal receives third scheduling control information sent by the base station. The third scheduling control information is used to instruct the first vehicle terminal to perform SPS activation.

The first vehicle terminal sends a V2V data packet to the second vehicle terminal based on the second SPS period.

Solution 2:

If the first vehicle terminal determines that the first vehicle terminal meets an SPS reactivation condition, the first vehicle terminal sends second indication information to the base station. The second indication information is used to indicate that the first vehicle terminal meets the SPS reactivation condition.

The first vehicle terminal receives fourth scheduling control information sent by the base station. The fourth scheduling control information is used to instruct the first vehicle terminal to perform SPS reactivation.

The first vehicle terminal sends a V2V data packet to the second vehicle terminal based on a third SPS period. The third SPS period is configured by the first vehicle terminal.

For example, that the first vehicle terminal determines that the first vehicle terminal meets an SPS reactivation condition may include:

if a ratio of a quantity of first SPS periods in which no data is sent and that are in M first SPS periods to M is greater than or equal to a second threshold, determining that the first vehicle terminal meets the SPS reactivation condition; or if a ratio of a quantity of first SPS periods in which no data is sent and that are in M first SPS periods to M is less than a second threshold, and the first vehicle terminal loses a V2V data packet in a first SPS period in which data is sent, determining that the first vehicle terminal meets the SPS reactivation condition, where M is an integer greater than or equal to 1.

The second threshold may be set according to a requirement. This is not limited in this embodiment of the present invention. When the ratio of the quantity of first SPS periods in which no data is sent to M is greater than or equal to the second threshold, it indicates that the specified first SPS period is excessively small, and a large SPS period needs to be reconfigured. When the ratio of the quantity of first SPS periods in which no data is sent to M is less than the second threshold, and when the first vehicle terminal loses the V2V data packet in the first SPS period in which data is sent, it indicates that the specified first SPS period is excessively large, and a small SPS period needs to be reconfigured.

It should be noted that, in the foregoing SPS reactivation process, if the first vehicle terminal does not receive the scheduling control information sent by the base station, or the base station does not receive the indication information reported by the first vehicle terminal or does not receive, before the timer expires, the indication information reported by the first vehicle terminal, it is determined that the reactivation procedure fails. In this case, the first vehicle terminal and the base station may perform processing by using a processing measure used when SPS activation fails. Details are not described herein.

Further, after the V2V data packet is sent to the second vehicle terminal based on the first SPS period, the method may further include:

determining, by the first vehicle terminal, that the first vehicle terminal meets an SPS deactivation condition;

sending, by the first vehicle terminal, third indication information to the base station, where the third indication information is used to indicate that the first vehicle terminal meets the SPS deactivation condition;

sending, by the base station, fifth scheduling control information to the first vehicle terminal, where the fifth scheduling control information is used to instruct the first vehicle terminal to perform SPS deactivation; and stopping, by the first vehicle terminal, sending the V2V data packet to the second vehicle terminal based on the first SPS period.

For example, the determining, by the first vehicle terminal, that the first vehicle terminal meets an SPS deactivation condition may include:

if no data is sent in Q first SPS periods that are consecutive in time, and Q is greater than or equal to a third threshold, determining that the first vehicle terminal meets the SPS deactivation condition; or if a size of a data packet that is sent in Q first SPS periods that are consecutive in time is less than a fourth threshold, determining that the first vehicle terminal meets the SPS deactivation condition, where Q is an integer greater than or equal to 1.

The third threshold and the fourth threshold may be set according to a requirement. This is not limited in this embodiment of the present invention.

In addition, it may be understood that, for the following special scenarios, the first vehicle terminal and the base station may use implicit SPS deactivation.

(1) If the first vehicle terminal detects that the first vehicle terminal moves from coverage of the base station to the outside of the coverage of the base station, the first vehicle terminal uses implicit SPS deactivation.

(2) When the base station determines that the first vehicle terminal falls beyond a cell served by the base station or cannot detect the first vehicle terminal, the base station actively releases a semi-static resource that is allocated to the first vehicle terminal.

It should be noted that, in this embodiment of the present invention, the first indication information, the second indication information, or the third indication information in the foregoing procedure may be carried in any one of the following information to be reported to the base station, so that the base station learns that an SPS activation procedure, an SPS reactivation procedure, or an SPS deactivation procedure can be triggered for the first vehicle terminal:

buffer status report (Buffer Status Report, BSR) information, Media Access Control control element (MAC CE) information, RRC information, or physical uplink control channel (PUCCH) information.

When the indication information is carried in the MAC CE to be reported to the base station, the indication information may be reported to the base station by using the MAC CE in the following two forms:

1. The indication information is reported to the base station by using a MAC CE subframe header.

For example, a MAC subframe header may be newly added to the MAC CE information, and the MAC subframe header may include a first field and a second field.

The first field may be used to indicate that the first SPS period is increased, the first SPS period is decreased, or the first SPS period does not need to be reconfigured; and the second field may be used to indicate the indication information.

Figure 4:
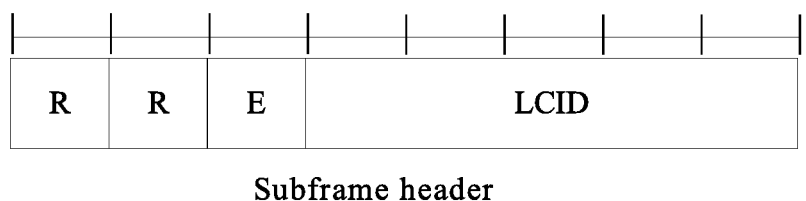
FIG. 4 is a structural diagram of a MAC CE message format according to an embodiment of the present invention.

Specifically, a MAC CE subframe header in a fixed size that is in an R/R/E/LCID form and that is shown in FIG. 4 may be added, and the subframe header is used to indicate SPS activation, SPS deactivation, and SPS reactivation.

In a logical channel identifier (LCD), bits 01100-10101 reserved in the 3GPP TS 36.321 protocol may be used to indicate SPS activation, SPS deactivation, and SPS reactivation. For example, 01110 may indicate SPS activation or SPS deactivation, and 01111 may indicate SPS deactivation.

For R/R/E, E is a reserved bit, is filled according to the protocol, and is usually filled with 0. To indicate whether an existing SPS period needs to be increased or decreased, when a value of R/R is 0/0, it indicates that the SPS period does not need to be reconfigured; when a value of R/R is 1/1, the SPS period needs to be increased; or when a value of R/R is 1/0, the SPS period needs to be decreased.

For example, if a quantity of bits filled in the MAC CE subframe header shown in FIG. 4 is 1/1/0/01110, it indicates that SPS activation is performed and the existing SPS period needs to be increased.

2. The indication information is reported to the base station by using a newly added MAC CE format.

For example, a control field including a first subfield, a second subfield, and a third subfield may be added to the existing MAC CE. The indication information is reported to the base station by using a new MAC CE format. The first subfield is used to indicate the indication information, the second subfield is used to indicate a size of the first SPS period, and the third subfield is used to indicate a size of a data packet sent in the first SPS period.

Figure 5:
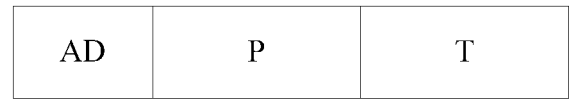
FIG. 5 is a structural diagram of another MAC CE message format according to an embodiment of the present invention.

Specifically, a field that includes three subfields AD/P/T and that is shown in FIG. 5 may be newly added, and the field may occupy 8 bits.

AD is 2 bits, and is used to indicate SPS activation, SPS reactivation, or SPS deactivation. For example, when AD is 01, it may indicate SPS activation or SPS deactivation; or when the AD is 10, it may indicate SPS deactivation.

P is 3 bits, and indicates a size of an SPS period. P may be any 3 bits in a range 000 to 111, and a corresponding value of P is 0 to 7, where 1 to 7 indicate that periods are respectively 100, 200, . . . , and 700, 0 indicates 50, and a unit is ms.

T is 3 bits, indicates a size of a data packet sent in an SPS period (usually a size of a resource block (RB)), and may be classified into four scales. For example, 000 indicates that an RB quantity is less than or equal to 3; 001 indicates that an RB quantity is greater than 3 and less than or equal to 5; 010 indicates that an RB quantity is greater than 5 and less than or equal to 10; 100 indicates that an RB quantity is greater than 10 and less than or equal to 15; 011 indicates that an RB quantity is greater than 15 and less than or equal to 20; 101 indicates an RB quantity is greater than 20 and less than or equal to 25; 110 indicates that an RB quantity is greater than 25 and greater than 20; and 110 indicates that an RB quantity is greater than 40 and greater than 30.

Correspondingly, after the base station receives the indication information, the base station may trigger the SPS activation procedure, the SPS reactivation procedure, or the SPS deactivation procedure for the first vehicle terminal based on the indication information by using physical downlink control channel (PDCCH) information. To be specific, the first scheduling control information, the second scheduling control information, the third scheduling control information, the fourth scheduling control information, or the fifth scheduling control information may be carried in the PDCCH information to be sent to the first vehicle terminal.

Specifically, a third field may be newly added to format information that is used to indicate a transport format of the PDCCH information and that is in the PDCCH information, and the third field is used to indicate the scheduling control information.

For example, a 2-bit SPS activation flag may be newly added to a DCI format 5 of the PDCCH information. 00 is used to indicate dynamic scheduling; 01 indicates SPS activation, and indicates that a bit bitmap that is allocated to a resource block and a hopping resource and that is in DCI-5 bits is set to 0; 10 indicates SPS reactivation, and indicates that a bit bitmap that is allocated to a resource block and a hopping resource and that is in DCI-5 bits is set to 0; and 11 indicates SPS deactivation, and indicates that a bit bitmap that is allocated to a resource block and a hopping resource and that is in DCI-5 bits is set to 1.

It may be learned from the above that, this embodiment of the present invention provides the V2V communication method. The base station sends, to the first vehicle terminal, the first SPS configuration parameter that includes the first SPS period. After receiving the first scheduling control information that is sent by the base station and that is used to instruct the first vehicle terminal to perform SPS activation, the first vehicle terminal sends the V2V data packet to the second vehicle terminal based on the first SPS period. In this way, semi-persistent scheduling is performed by using the base station. Therefore, the V2V data packet is periodically sent, and PDCCH information delivered by the base station does not need to be received each time before V2V communication, so as to reduce scheduling overheads of the PDCCH information of the base station, increase a network capacity, and reduce a service processing delay of V2V communication.

Specifically, as described in Embodiment 2 and Embodiment 3, the present invention further provides a vehicle terminal and a base station to be preferably configured to implement the method in the foregoing method embodiment.

Embodiment 2

Figure 6:
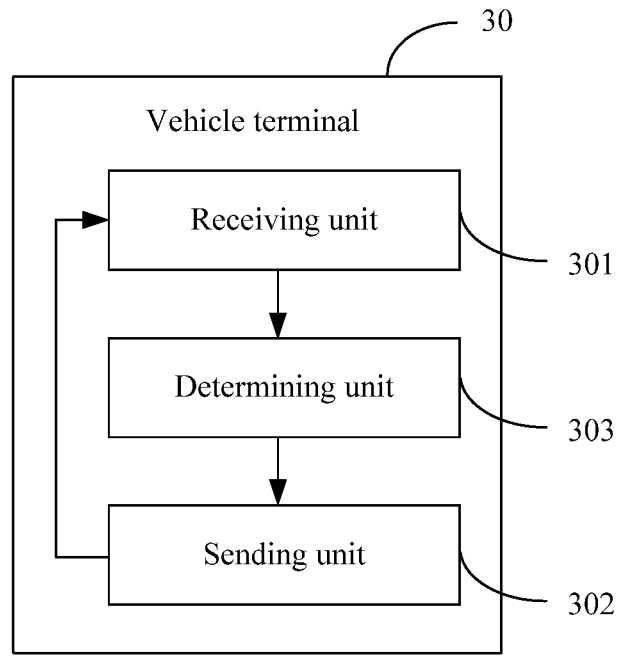
FIG. 6 is a structural diagram of a vehicle terminal according to an embodiment of the present invention.

FIG. 6 is a structural diagram of a vehicle terminal 30 according to an embodiment of the present invention. The vehicle terminal 30 is configured to execute an action executed by the first vehicle terminal in Embodiment 1. As shown in FIG. 6, the vehicle terminal 30 may include a receiving unit 301 and a sending unit 302.

The receiving unit 301 is configured to receive a first semi-persistent scheduling SPS configuration parameter sent by a base station. The first SPS configuration parameter includes a first SPS period.

The first SPS period may be set according to a time rule in which the vehicle terminal sends a message to another vehicle terminal, to be specific, may be set according to a packet sent rule in a V2V service model. The first SPS period may include at least one scheduling control (SC) period. Generally, a semi-persistent scheduling period semiPersistSchedInterval_Vue=min((V2V service period/SC period)*SC period, N*SC period).

The receiving unit 301 is further configured to receive first scheduling control information sent by the base station. The first scheduling control information is used to instruct the vehicle terminal to perform SPS activation.

The sending unit 302 is configured to send a V2V data packet to a second vehicle terminal based on the first SPS period.

Optionally, the vehicle terminal may determine that the vehicle terminal meets an SPS activation condition; send, to the base station, indication information that is used to indicate that the vehicle terminal meets the SPS activation condition; and then receive the scheduling control information sent by the base station. Alternatively, the base station determines that the vehicle terminal meets an SPS activation condition, and then directly sends the scheduling control information to the vehicle terminal. Specifically, as shown in FIG. 6, the vehicle terminal may further include:

a determining unit 303, configured to: after the receiving unit 301 receives the first semi-persistent scheduling SPS configuration parameter sent by the base station, before the receiving unit 301 receives the first scheduling control information sent by the base station, determine that the vehicle terminal meets an SPS activation condition.

The sending unit 302 is further configured to: after the determining unit 303 determines that the vehicle terminal meets the SPS activation condition, send first indication information to the base station. The first indication information is used to indicate that the vehicle terminal meets the SPS activation condition.

Optionally, the determining unit 303 may be specifically configured to:

if the vehicle terminal consecutively receives or sends N data packets, all the N data packets are V2V data packets, and a receiving or sending time interval between any two adjacent data packets in the N data packets meets a preset time interval, determine that the vehicle terminal meets the SPS activation condition.

N is greater than or equal to a first threshold, the preset time interval may be a security message sending period, and the first threshold may be set according to a requirement. This is not limited in this embodiment of the present invention. Preferably, the first threshold may be set to 4.

Certainly, in a V2V communication process, the vehicle terminal 30 may further be used as a receiver to receive SA and a V2V data packet that are sent by another vehicle terminal. Specifically, the receiving unit 301 may be further configured to receive the SA and the V2V data packet that are sent by the another vehicle terminal.

The determining unit 303 is further configured to: determine, based on the received SA message, information about a time-frequency resource of the V2V data packet, and obtain the V2V data packet through demodulation.

Further, in an embodiment of an actual application, a sending period of a data packet sent by the vehicle terminal or a size of a sent data packet may change. To adapt to these changes, SPS reactivation further needs to be performed on the first vehicle terminal, to change the SPS period or a size of a time-frequency resource for sending the V2V data packet. Specifically, the determining unit 303 is further configured to:

after the sending unit 302 sends the V2V data packet to the second vehicle terminal based on the first SPS period, determine that the vehicle terminal meets an SPS reactivation condition.

The sending unit 302 is further configured to: after the determining unit 303 determines that the vehicle terminal meets the SPS reactivation condition, send second indication information to the base station. The second indication information is used to indicate that the vehicle terminal meets the SPS reactivation condition.

The receiving unit 301 is further configured to: after the sending unit 302 sends the second indication information to the base station, receive second scheduling control information sent by the base station, where the second scheduling control information is used to instruct the vehicle terminal to perform SPS deactivation;

receive a second SPS configuration parameter sent by the base station, where the second SPS configuration parameter includes a second SPS period; and receive third scheduling control information sent by the base station, where the third scheduling control information is used to instruct the vehicle terminal to perform SPS activation.

The sending unit 302 is further configured to send a V2V data packet to the second vehicle terminal based on the second SPS period.

Alternatively, the receiving unit 301 is further configured to: after the sending unit 302 sends the second indication information to the base station, receive fourth scheduling control information sent by the base station. The fourth scheduling control information is used to instruct the vehicle terminal to perform SPS reactivation.

The sending unit 302 is further configured to send a V2V data packet to the second vehicle terminal based on a third SPS period. The third SPS period is configured by the vehicle terminal.

Optionally, the determining unit 303 may be specifically configured to: determine, by using the following method, whether the vehicle terminal meets the SPS reactivation condition, and if a ratio of a quantity of first SPS periods in which no data is sent and that are in M first SPS periods to M is greater than or equal to a second threshold, determine that the vehicle terminal meets the SPS reactivation condition; or if a ratio of a quantity of first SPS periods in which no data is sent and that are in M first SPS periods to M is less than a second threshold, and the vehicle terminal loses a V2V data packet in a first SPS period in which data is sent, determine that the vehicle terminal meets the SPS reactivation condition, where M is an integer greater than or equal to 1.

The second threshold may be set according to a requirement. This is not limited in this embodiment of the present invention. When the ratio of the quantity of first SPS periods in which no data is sent to M is greater than or equal to the second threshold, it indicates that the specified first SPS period is excessively small, and a large SPS period needs to be reconfigured. When the ratio of the quantity of first SPS periods in which no data is sent to M is less than the second threshold, and when the first vehicle terminal loses the V2V data packet in the first SPS period in which data is sent, it indicates that the specified first SPS period is excessively large, and a small SPS period needs to be reconfigured.

Further, the determining unit 303 is further configured to: after the sending unit 302 sends the V2V data packet to the second vehicle terminal based on the first SPS period, determine that the vehicle terminal meets an SPS deactivation condition.

The sending unit 302 is further configured to: after the determining unit 303 determines that the vehicle terminal meets the SPS deactivation condition, send third indication information to the base station. The third indication information is used to indicate that the vehicle terminal meets the SPS deactivation condition.

The receiving unit 301 is further configured to receive fifth scheduling control information sent by the base station. The fifth scheduling control information is used to instruct the vehicle terminal to perform SPS deactivation.

The sending unit 302 is further configured to stop sending the V2V data packet to the second vehicle terminal based on the first SPS period.

Optionally, the determining unit 303 may be specifically configured to: determine, in the following manner, whether the vehicle terminal meets the SPS deactivation condition, and if no data is sent in Q first SPS periods that are consecutive in time, and Q is greater than or equal to a third threshold, determine that the vehicle terminal meets the SPS deactivation condition; or if a size of a data packet that is sent in Q first SPS periods that are consecutive in time is less than a fourth threshold, determine that the vehicle terminal meets the SPS deactivation condition, where Q is an integer greater than or equal to 1.

The third threshold and the fourth threshold may be set according to a requirement. This is not limited in this embodiment of the present invention.

In addition, it may be understood that, for the following special scenarios, the vehicle terminal and the base station may use implicit SPS deactivation:

(1) If the vehicle terminal detects that the vehicle terminal moves from coverage of the base station to the outside of the coverage of the base station, the vehicle terminal uses implicit SPS deactivation.

(2) When the base station determines that the vehicle terminal falls beyond a cell served by the base station or cannot detect the vehicle terminal, the base station actively releases a semi-static resource that is allocated to the first vehicle terminal.

It should be noted that, in this embodiment of the present invention, the first indication information, the second indication information, or the third indication information in the foregoing procedure may be carried in any one of the following information to be reported to the base station, so that the base station learns that an SPS activation procedure, an SPS reactivation procedure, or an SPS deactivation procedure can be triggered for the first vehicle terminal:

BSR information, MAC CE information, RRC information, and physical uplink control channel (Physical Uplink Control Channel, PUCCH) information.

When the indication information is carried in the MAC CE to be reported to the base station, the indication information may be reported to the base station by using the MAC CE in the following two forms:

1. The indication information is reported to the base station by using a MAC CE subframe header.

For example, a MAC subframe header may be newly added to the MAC CE information, and the MAC subframe header may include a first field and a second field.

The first field may be used to indicate that the first SPS period is increased, the first SPS period is decreased, or the first SPS period does not need to be reconfigured; and the second field may be used to indicate the indication information.

Specifically, a MAC CE subframe header in a fixed size that is in an R/R/E/LCID form and that is shown in FIG. 4 may be added, and the subframe header is used to indicate SPS activation, SPS deactivation, and SPS reactivation.

An LCD may use bits 01100-10101 reserved in the 36.321 protocol to indicate SPS activation, SPS deactivation, and SPS reactivation. For example, 01110 may indicate SPS activation or SPS deactivation, and 01111 may indicate SPS deactivation.

For R/R/E, E is a reserved bit, is filled according to the protocol, and is usually filled with 0. To indicate whether an existing SPS period needs to be increased or decreased, when a value of R/R is 0/0, it indicates that the SPS period does not need to be reconfigured; when a value of R/R is 1/1, the SPS period needs to be increased; or when a value of R/R is 1/0, the SPS period needs to be decreased.

For example, if a quantity of bits filled in the MAC CE subframe header shown in FIG. 4 is 1/1/0/01110, it indicates that SPS activation is performed and the existing SPS period needs to be increased.

2. The indication information is reported to the base station by using a newly added MAC CE format.

For example, a control field including a first subfield, a second subfield, and a third subfield may be added to the existing MAC CE. The indication information is reported to the base station by using a new MAC CE format. The first subfield is used to indicate the indication information, the second subfield is used to indicate a size of the first SPS period, and the third subfield is used to indicate a size of a data packet sent in the first SPS period.

Specifically, a field that includes three subfields AD/P/T and that is shown in FIG. 5 may be newly added, and the field may occupy 8 bits.

AD is 2 bits, and is used to indicate SPS activation, SPS reactivation, or SPS deactivation. For example, when AD is 01, it may indicate SPS activation or SPS deactivation; or when the AD is 10, it may indicate SPS deactivation.

P is 3 bits, and indicates a size of an SPS period. P may be any 3 bits in a range 000 to 111, and a corresponding value of P is 0 to 7, where 1 to 7 indicate that periods are respectively 100, 200, . . . , and 700, 0 indicates 50, and a unit is ms.

T is 3 bits, indicates a size of a data packet sent in an SPS period (usually a size of a resource block (RB)), and may be classified into four scales. For example, 000 indicates that an RB quantity is less than or equal to 3; 001 indicates that an RB quantity is greater than 3 and less than or equal to 5; 010 indicates that an RB quantity is greater than 5 and less than or equal to 10; 100 indicates that an RB quantity is greater than 10 and less than or equal to 15; 011 indicates that an RB quantity is greater than 15 and less than or equal to 20; 101 indicates an RB quantity is greater than 20 and less than or equal to 25; 110 indicates that an RB quantity is greater than 25 and greater than 20; and 110 indicates that an RB quantity is greater than 40 and greater than 30.

Correspondingly, after the base station receives the indication information, the base station may trigger the SPS activation procedure, the SPS reactivation procedure, or the SPS deactivation procedure for the first vehicle terminal based on the indication information by using physical downlink control channel (PDCCH) information. To be specific, the first scheduling control information, the second scheduling control information, the third scheduling control information, the fourth scheduling control information, or the fifth scheduling control information may be carried in the PDCCH information to be sent to the first vehicle terminal.

Specifically, a third field may be newly added to format information that is used to indicate a transport format of the PDCCH information and that is in the PDCCH information, and the third field is used to indicate the scheduling control information.

It should be noted that, the receiving unit 301 and the sending unit 302 of the vehicle terminal 30 shown in FIG. 6 in the present invention may be the communications unit 2011 of the vehicle terminal 20 shown in FIG. 2. The determining unit 303 may be an independently disposed processor; or may be integrated into a processor of the vehicle terminal; or in addition, may be stored in a memory of the vehicle terminal in a form of program code, so that a processor of the vehicle terminal invokes the program code and executes a function constructed in the foregoing knowledge base. The processor described herein may be a central processing unit (CPU), or an application-specific integrated circuit (ASIC), or one or more integrated circuits configured to implement this embodiment of the present invention.

It may be learned from the above that, this embodiment of the present invention provides the vehicle terminal. The vehicle terminal receives the first SPS configuration parameter that is sent by the base station and that includes the first SPS period. After receiving the first scheduling control information that is sent by the base station and that is used to instruct the first vehicle terminal to perform SPS activation, the vehicle terminal sends the V2V data packet to the second vehicle terminal based on the first SPS period. In this way, semi-persistent scheduling is performed by using the base station. Therefore, the V2V data packet is periodically sent, and PDCCH information delivered by the base station does not need to be received each time before V2V communication, so as to reduce scheduling overheads of the PDCCH information of the base station, increase a network capacity, and reduce a service processing delay of V2V communication.

Embodiment 3

Figure 7:
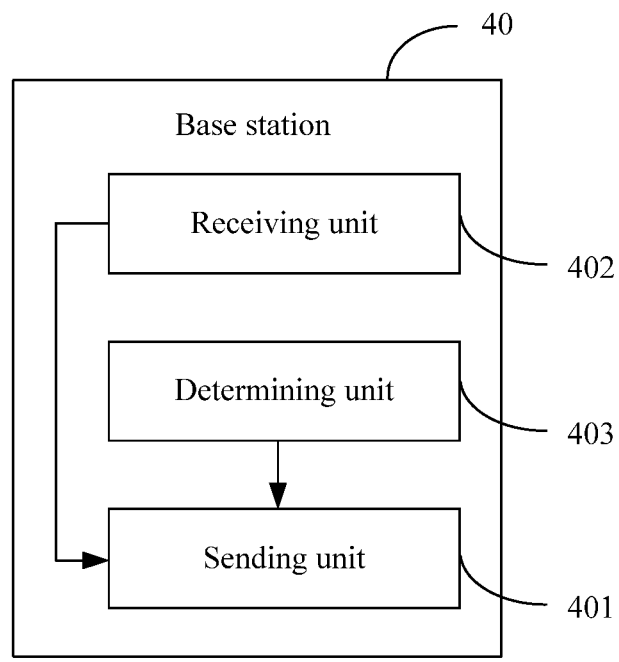
FIG. 7 is a structural diagram of a base station according to an embodiment of the present invention.

FIG. 7 is a structural diagram of a base station 40 according to an embodiment of the present invention. The base station 40 is configured to execute actions executed by the base station in Embodiment 1. As shown in FIG. 7, the base station 40 may include a sending unit 401.

The sending unit 401 is configured to: send a first semi-persistent scheduling SPS configuration parameter to a first vehicle terminal, where the first SPS configuration parameter includes a first SPS period; and send first scheduling control information to the first vehicle terminal, so that the first vehicle terminal sends a V2V data packet to a second vehicle terminal based on the first SPS period, where the first scheduling control information is used to instruct the first vehicle terminal to perform SPS activation.

The first SPS period may be set according to a time rule in which the first vehicle terminal sends a message to another vehicle terminal, to be specific, may be set according to a packet sent rule in a V2V service model. The first SPS period may include at least one scheduling control (SC) period. Generally, a semi-persistent scheduling period semiPersistSchedInterval_Vue=min((V2V service period/SC period)*SC period, N*SC period).

Optionally, the vehicle terminal may determine that the vehicle terminal meets an SPS activation condition; send, to the base station, indication information that is used to indicate that the vehicle terminal meets the SPS activation condition; and then receive the scheduling control information sent by the base station. Alternatively, the base station determines that the vehicle terminal meets an SPS activation condition, and then directly sends the scheduling control information to the vehicle terminal. Specifically, as shown in FIG. 7, the base station 40 may further include:

a receiving unit 402, configured to: before the sending unit 401 sends the first scheduling control information to the first vehicle terminal, receive first indication information sent by the first vehicle terminal, where the first indication information is used to indicate that the first vehicle terminal meets an SPS activation condition.

Alternatively, the base station may further include:

a determining unit 403, configured to: before the sending unit 401 sends the first scheduling control information to the first vehicle terminal, determine that there is an idle resource to be allocated to the first vehicle terminal, and determine that the first vehicle terminal meets an SPS activation condition.

The determining unit 403 is further configured to: after the receiving unit 402 receives the first indication information sent by the first vehicle terminal, determine a sending moment at which the first vehicle terminal sends the first indication information; and determine a first moment based on the sending moment of the first indication information and the first SPS period.

The sending unit 401 is specifically configured to send the first scheduling control information to the first vehicle terminal at the first moment.

Optionally, the determining unit 403 may be specifically configured to:

collect a data packet received or sent by the first vehicle terminal; and if the first vehicle terminal consecutively receives or sends N data packets, all the N data packets are V2V data packets, and a receiving or sending time interval between any two adjacent data packets in the N data packets meets a preset time interval, determine that the first vehicle terminal meets the SPS activation condition.

Further, in an embodiment of an actual application, a sending period of a data packet sent by the vehicle terminal or a size of a sent data packet may change. To adapt to these changes, SPS reactivation further needs to be performed on the first vehicle terminal, to change the SPS period or a size of a time-frequency resource for sending the V2V data packet. Specifically, The receiving unit 402 may be further configured to: after the sending unit 401 sends the first scheduling control information to the first vehicle terminal, receive second indication information sent by the first vehicle terminal. The second indication information is used to indicate that the first vehicle terminal meets an SPS reactivation condition.

The sending unit 401 is further configured to: send second scheduling control information to the first vehicle terminal, where the second scheduling control information is used to instruct the first vehicle terminal to perform SPS deactivation;

send a second SPS configuration parameter to the first vehicle terminal, where the second SPS configuration parameter includes a second SPS period; and send third scheduling control information to the first vehicle terminal, so that the first vehicle terminal sends a V2V data packet to the second vehicle terminal based on the second SPS period, where the third scheduling control information is used to instruct the first vehicle terminal to perform SPS activation.

Alternatively, the receiving unit 402 may be further configured to: after the sending unit 401 sends the first scheduling control information to the first vehicle terminal, receive second indication information sent by the first vehicle terminal. The second indication information is used to indicate that the first vehicle terminal meets an SPS reactivation condition.

The sending unit 401 is configured to send fourth scheduling control information to the first vehicle terminal, so that the first vehicle terminal sends a V2V data packet to the second vehicle terminal based on a third SPS period.

The fourth scheduling control information is used to instruct the first vehicle terminal to perform SPS reactivation, and the third SPS period is configured by the first vehicle terminal.

Further, the receiving unit 402 may be configured to: after the sending unit 401 sends the first scheduling control information to the first vehicle terminal, receive third indication information sent by the first vehicle terminal. The third indication information is used to indicate that the first vehicle terminal meets an SPS deactivation condition.

The sending unit 401 is further configured to send fifth scheduling control information to the first vehicle terminal, so that the first vehicle terminal stops sending the V2V data packet to the second vehicle terminal based on the first SPS period. The fifth scheduling control information is used to instruct the first vehicle terminal to perform SPS deactivation.

It should be noted that, in this embodiment of the present invention, the first indication information, the second indication information, or the third indication information in the foregoing procedure may be carried in any one of the following information to be reported to the base station, so that the base station learns that an SPS activation procedure, an SPS reactivation procedure, or an SPS deactivation procedure can be triggered for the first vehicle terminal:

BSR information, MAC CE information, RRC information, or physical uplink control channel (PUCCH) information.

When the indication information is carried in the MAC CE to be reported to the base station, the indication information may be reported to the base station by using the MAC CE in the following two forms:

1. The indication information is reported to the base station by using a MAC CE subframe header.

For example, a MAC subframe header may be newly added to the MAC CE information, and the MAC subframe header may include a first field and a second field.

The first field may be used to indicate that the first SPS period is increased, the first SPS period is decreased, or the first SPS period does not need to be reconfigured; and the second field may be used to indicate the indication information.

Specifically, a MAC CE subframe header in a fixed size that is in an R/R/E/LCID form and that is shown in FIG. 4 may be added, and the subframe header is used to indicate SPS activation, SPS deactivation, and SPS reactivation.

An LCD may use bits 01100-10101 reserved in the 36.321 protocol to indicate SPS activation, SPS deactivation, and SPS reactivation. For example, 01110 may indicate SPS activation or SPS deactivation, and 01111 may indicate SPS deactivation.

For R/R/E, E is a reserved bit, is filled according to the protocol, and is usually filled with 0. To indicate whether an existing SPS period needs to be increased or decreased, when a value of R/R is 0/0, it indicates that the SPS period does not need to be reconfigured; when a value of R/R is 1/1, the SPS period needs to be increased; or when a value of R/R is 1/0, the SPS period needs to be decreased.

For example, if a quantity of bits filled in the MAC CE subframe header shown in FIG. 4 is 1/1/0/01110, it indicates that SPS activation is performed and the existing SPS period needs to be increased.

2. The indication information is reported to the base station by using a newly added MAC CE format.

For example, a control field including a first subfield, a second subfield, and a third subfield may be added to the existing MAC CE. The indication information is reported to the base station by using a new MAC CE format. The first subfield is used to indicate the indication information, the second subfield is used to indicate a size of the first SPS period, and the third subfield is used to indicate a size of a data packet sent in the first SPS period.

Specifically, a field that includes three subfields AD/P/T and that is shown in FIG. 5 may be newly added, and the field may occupy 8 bits.

AD is 2 bits, and is used to indicate SPS activation, SPS reactivation, or SPS deactivation. For example, when AD is 01, it may indicate SPS activation or SPS deactivation; or when the AD is 10, it may indicate SPS deactivation.

P is 3 bits, and indicates a size of an SPS period. P may be any 3 bits in a range 000 to 111, and a corresponding value of P is 0 to 7, where 1 to 7 indicate that periods are respectively 100, 200, . . . , and 700, 0 indicates 50, and a unit is ms.

T is 3 bits, indicates a size of a data packet sent in an SPS period (usually a size of a resource block (RB)), and may be classified into four scales. For example, 000 indicates that an RB quantity is less than or equal to 3; 001 indicates that an RB quantity is greater than 3 and less than or equal to 5; 010 indicates that an RB quantity is greater than 5 and less than or equal to 10; 100 indicates that an RB quantity is greater than 10 and less than or equal to 15; 011 indicates that an RB quantity is greater than 15 and less than or equal to 20; 101 indicates an RB quantity is greater than 20 and less than or equal to 25; 110 indicates that an RB quantity is greater than 25 and greater than 20; and 110 indicates that an RB quantity is greater than 40 and greater than 30.

Correspondingly, after the base station receives the indication information, the base station may trigger the SPS activation procedure, the SPS reactivation procedure, or the SPS deactivation procedure for the first vehicle terminal based on the indication information by using physical downlink control channel (PDCCH) information. To be specific, the first scheduling control information, the second scheduling control information, the third scheduling control information, the fourth scheduling control information, or the fifth scheduling control information may be carried in the PDCCH information to be sent to the first vehicle terminal.

Specifically, a third field may be newly added to format information that is used to indicate a transport format of the PDCCH information and that is in the PDCCH information, and the third field is used to indicate the scheduling control information.

It should be noted that, the sending unit 401 and the receiving unit 402 of the base station shown in FIG. 7 in the present invention may be the communications unit 1011 of the base station 10 shown in FIG. 2. The determining unit 403 may be an independently disposed processor; or may be integrated into a processor of the base station; or in addition, may be stored in a memory of the base station in a form of program code, so that a processor of the base station invokes the program code and executes a function constructed in the foregoing knowledge base. The processor described herein may be a central processing unit (CPU), or an application-specific integrated circuit (ASIC), or one or more integrated circuits configured to implement this embodiment of the present invention. Specifically, as described in Embodiment 2, the present invention further provides a base station, preferably configured to implement the method in the foregoing method embodiment.

It may be learned from the above that, this embodiment of the present invention provides a base station. The base station sends, to the first vehicle terminal, the first SPS configuration parameter that includes the first SPS period. After receiving the first scheduling control information that is sent by the base station and that is used to instruct the first vehicle terminal to perform SPS activation, the first vehicle terminal sends the V2V data packet to the second vehicle terminal based on the first SPS period. In this way, semi-persistent scheduling is performed by using the base station. Therefore, the V2V data packet is periodically sent, and PDCCH information delivered by the base station does not need to be received each time before V2V communication, so as to reduce scheduling overheads of the PDCCH information of the base station, increase a network capacity, and reduce a service processing delay of V2V communication.

It may be clearly understood by a person skilled in the art that, for the purpose of convenient and brief description, for a detailed working process of the foregoing unit and system, reference may be made to a corresponding process in the foregoing method embodiments. Details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

A person of ordinary skill in the art may understand that all or some of the steps of the methods in the embodiments may be implemented by a program instructing relevant hardware (for example, a processor). The program may be stored in a computer readable storage medium. The storage medium may include: a read-only memory, a random access memory, a magnetic disk, an optical disc, or the like.

Finally, it should be noted that the foregoing embodiments are merely intended for describing the technical solutions of the present invention but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A vehicle to vehicle (V2V) communication method, wherein the method comprises:

receiving, by a first vehicle terminal, a first semi-persistent scheduling (SPS) configuration parameter sent by a base station, wherein the first SPS configuration parameter comprises a first SPS period;

determining, by the first vehicle terminal after the receiving the first semi-persistent scheduling SPS configuration parameter sent by the base station, that the first vehicle terminal meets an SPS activation condition comprising if the first vehicle terminal consecutively receives or sends N data packets, all the N data packets are V2V data packets, and a receiving or sending time interval between any two adjacent data packets in the N data packets meets a preset time interval, determining that the first vehicle terminal meets the SPS activation condition, wherein N is greater than or equal to a first threshold;

sending, by the first vehicle terminal before the receiving first scheduling control information sent by the base station, first indication information to the base station, wherein the first indication information indicates that the first vehicle terminal meets the SPS activation condition; and receiving, by the first vehicle terminal, first scheduling control information sent by the base station, and sending a V2V data packet to a second vehicle terminal based on the first SPS period, wherein the first scheduling control information instructs the first vehicle terminal to perform SPS activation.

2. The method according to claim 1, wherein after the sending the V2V data packet to the second vehicle terminal based on the first SPS period, the method further comprises:

determining, by the first vehicle terminal, that the first vehicle terminal meets an SPS reactivation condition; and sending, by the first vehicle terminal, second indication information to the base station, wherein the second indication information indicates that the first vehicle terminal meets the SPS reactivation condition.

3. The method according to claim 2, wherein the determining that the first vehicle terminal meets an SPS reactivation condition comprises:

if a ratio of a quantity of first SPS periods in which no data is sent and that are in M first SPS periods to M is greater than or equal to a second threshold, determining that the first vehicle terminal meets the SPS reactivation condition; or if a ratio of a quantity of first SPS periods in which no data is sent and that are in M first SPS periods to M is less than a second threshold, and the first vehicle terminal loses a V2V data packet in a first SPS period in which data is sent, determining that the first vehicle terminal meets the SPS reactivation condition, wherein M is an integer greater than or equal to 1.

4. The method according to claim 2, wherein after the sending second indication information to the base station, the method further comprises:

receiving second scheduling control information sent by the base station, wherein the second scheduling control information instructs the first vehicle terminal to perform SPS deactivation;

receiving a second SPS configuration parameter sent by the base station, wherein the second SPS configuration parameter comprises a second SPS period;

receiving third scheduling control information sent by the base station, wherein the third scheduling control information instructs the first vehicle terminal to perform SPS activation; and sending a V2V data packet to the second vehicle terminal based on the second SPS period.

5. A vehicle terminal, wherein the vehicle terminal comprises:

a receiving unit, configured to receive a first semi-persistent scheduling (SPS) configuration parameter sent by a base station, wherein the first SPS configuration parameter comprises a first SPS period, a determining unit, configured to: after the receiving unit receives the first semi-persistent scheduling SPS configuration parameter sent by the base station, and before the receiving unit receives the first scheduling control information sent by the base station, determine that the vehicle terminal meets an SPS activation condition comprising if the vehicle terminal consecutively receives or sends N data packets, all the N data packets are V2V data packets, and a receiving or sending time interval between any two adjacent data packets in the N data packets meets a preset time interval, determine that the vehicle terminal meets the SPS activation condition, wherein N is greater than or equal to a first threshold, a sending unit configured to: after the determining unit determines that the vehicle terminal meets the SPS activation condition, send first indication information to the base station, wherein the first indication information indicates that the vehicle terminal meets the SPS activation condition, and the receiving unit is further configured to receive first scheduling control information sent by the base station, wherein the first scheduling control information instructs the vehicle terminal to perform SPS activation; and the sending unit is further configured to send a vehicle to vehicle (V2V) data packet to a second vehicle terminal based on the first SPS period.

6. The vehicle terminal according to claim 5, wherein the vehicle terminal further comprises:

a determining unit, configured to: after the sending unit sends the V2V data packet to the second vehicle terminal based on the first SPS period, determine that the vehicle terminal meets an SPS reactivation condition; and the sending unit is further configured to: after the determining unit determines that the vehicle terminal meets the SPS reactivation condition, send second indication information to the base station, wherein the second indication information indicates that the vehicle terminal meets the SPS reactivation condition.

7. The vehicle terminal according to claim 6, wherein the determining unit is specifically configured to:

if a ratio of a quantity of first SPS periods in which no data is sent and that are in M first SPS periods to M is greater than or equal to a second threshold, determine that the vehicle terminal meets the SPS reactivation condition; or if a ratio of a quantity of first SPS periods in which no data is sent and that are in M first SPS periods to M is less than a second threshold, and the vehicle terminal loses a V2V data packet in a first SPS period in which data is sent, determine that the vehicle terminal meets the SPS reactivation condition, wherein M is an integer greater than or equal to 1.

8. The vehicle terminal according to claim 6, wherein the receiving unit is further configured to: after the sending unit sends the second indication information to the base station, receive second scheduling control information sent by the base station, wherein the second scheduling control information instructs the vehicle terminal to perform SPS deactivation;

receive a second SPS configuration parameter sent by the base station, wherein the second SPS configuration parameter comprises a second SPS period; and receive third scheduling control information sent by the base station, wherein the third scheduling control information instructs the vehicle terminal to perform SPS activation; and the sending unit is further configured to send a V2V data packet to the second vehicle terminal based on the second SPS period.

9. A base station, wherein the base station comprises:

a sending unit, configured to: send a first semi-persistent scheduling (SPS) configuration parameter to a first vehicle terminal, wherein the first SPS configuration parameter comprises a first SPS period;

a receiving unit configured to: before the sending unit sends a first scheduling control information to the first vehicle terminal, receive first indication information sent by the first vehicle terminal, wherein the first indication information indicates that the first vehicle terminal meets an SPS activation condition, a determining unit configured to: collect a data packet received by or sent by the first vehicle terminal, and if the first vehicle terminal has consecutively received or sent N data packets, all the N data packets are V2V data packets, and a time interval between any two adjacent data packets in the N data packets meets a preset time interval, determine that the first vehicle terminal meets the SPS activation condition; and send the first scheduling control information to the first vehicle terminal, causing the first vehicle terminal to send a vehicle to vehicle (V2V) data packet to a second vehicle terminal based on the first SPS period, wherein the first scheduling control information instructs the first vehicle terminal to perform SPS activation.

10. The base station according to claim 9, wherein the base station further comprises:

the determining unit, configured to: before the sending unit sends the first scheduling control information to the first vehicle terminal, determine that there is an idle resource to be allocated to the first vehicle terminal, and determine that the first vehicle terminal meets an SPS activation condition.

11. The base station according to claim 10, wherein the determining unit is further configured to: after the receiving unit receives the first indication information sent by the first vehicle terminal, determine a sending moment at which the first vehicle terminal sends the first indication information; and determine a first moment based on the sending moment of the first indication information and the first SPS period; and the sending unit is specifically configured to send the first scheduling control information to the first vehicle terminal at the first moment.

12. The base station according to claim 9, wherein the base station further comprises:

the receiving unit, configured to: after the sending unit sends the first scheduling control information to the first vehicle terminal, receive second indication information sent by the first vehicle terminal, wherein the second indication information indicates that the first vehicle terminal meets an SPS reactivation condition; and the sending unit is further configured to: send second scheduling control information to the first vehicle terminal, wherein the second scheduling control information instructs the first vehicle terminal to perform SPS deactivation;

send a second SPS configuration parameter to the first vehicle terminal, wherein the second SPS configuration parameter comprises a second SPS period; and send third scheduling control information to the first vehicle terminal, so that the first vehicle terminal sends a V2V data packet to the second vehicle terminal based on the second SPS period, wherein the third scheduling control information instructs the first vehicle terminal to perform SPS activation.

13. The base station according to claim 9, wherein the base station further comprises:

the receiving unit, configured to: after the sending unit sends the first scheduling control information to the first vehicle terminal, receive second indication information sent by the first vehicle terminal, wherein the second indication information indicates that the first vehicle terminal meets an SPS reactivation condition; and the sending unit is configured to send fourth scheduling control information to the first vehicle terminal, so that the first vehicle terminal sends a V2V data packet to the second vehicle terminal based on a third SPS period, wherein the fourth scheduling control information instructs the first vehicle terminal to perform SPS reactivation, and the third SPS period is configured by the first vehicle terminal.

* * * * *